United States Patent
Teschner et al.

(12)
(10) Patent No.: US 6,517,148 B1
(45) Date of Patent: Feb. 11, 2003

(54) SOLAR COVER FOR A MOTOR VEHICLE ROOF AND A PROCESS FOR ITS MANUFACTURE

(75) Inventors: Helmut Teschner, Finning (DE); Thomas Ganz, Stockdorf (DE); Reinhard Wecker, Eichenau (DE); Werner Pätz, Hofstetten (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/597,459

(22) Filed: Jun. 19, 2000

(30) Foreign Application Priority Data

Jun. 19, 1999 (DE) .......................................... 199 28 116

(51) Int. Cl.[7] .................................................. B60J 7/00
(52) U.S. Cl. ..................................... 296/211; 296/216.09
(58) Field of Search ................................ 296/211, 215, 296/216.06, 216.09

(56) References Cited

U.S. PATENT DOCUMENTS 3,830,484 A * 8/1974 Webasto ...................... 296/211
6,155,635 A * 12/2000 Wecker ........................ 296/211

FOREIGN PATENT DOCUMENTS

| DE | 41 04 713 | 8/1991 |
|----|-----------|--------|
| DE | 41 05 396 | 9/1992 |
| EP | 0 343 628 | 11/1989 |

OTHER PUBLICATIONS

English translation of Japanese priority application which was the basis for German patent application DE–OS 38 30 484, 10 pp.

* cited by examiner

*Primary Examiner*—Dennis H. Pedder
(74) *Attorney, Agent, or Firm*—Nixon Peabody LLP; David S. Safran

(57) ABSTRACT

A solar cover for a motor vehicle roof, which is provided with an outside transparent cover plate (12) and an inside cover (14) between which at least one solar cell (18) is embedded, an electrical contact (28) from which the solar current from the at least one solar cell is directed to the motor vehicle, and an electrical connector element which produces electrical contact between the at least one solar cell and the contact is embedded between the cover plate and the cover. The contact (28) is located in the horizontal direction outside of the area of the cover plate (12) which is covered by the cover (14) and the electrical connector (26) extends in the horizontal direction beyond the area covered by the cover to the contact.

7 Claims, 1 Drawing Sheet

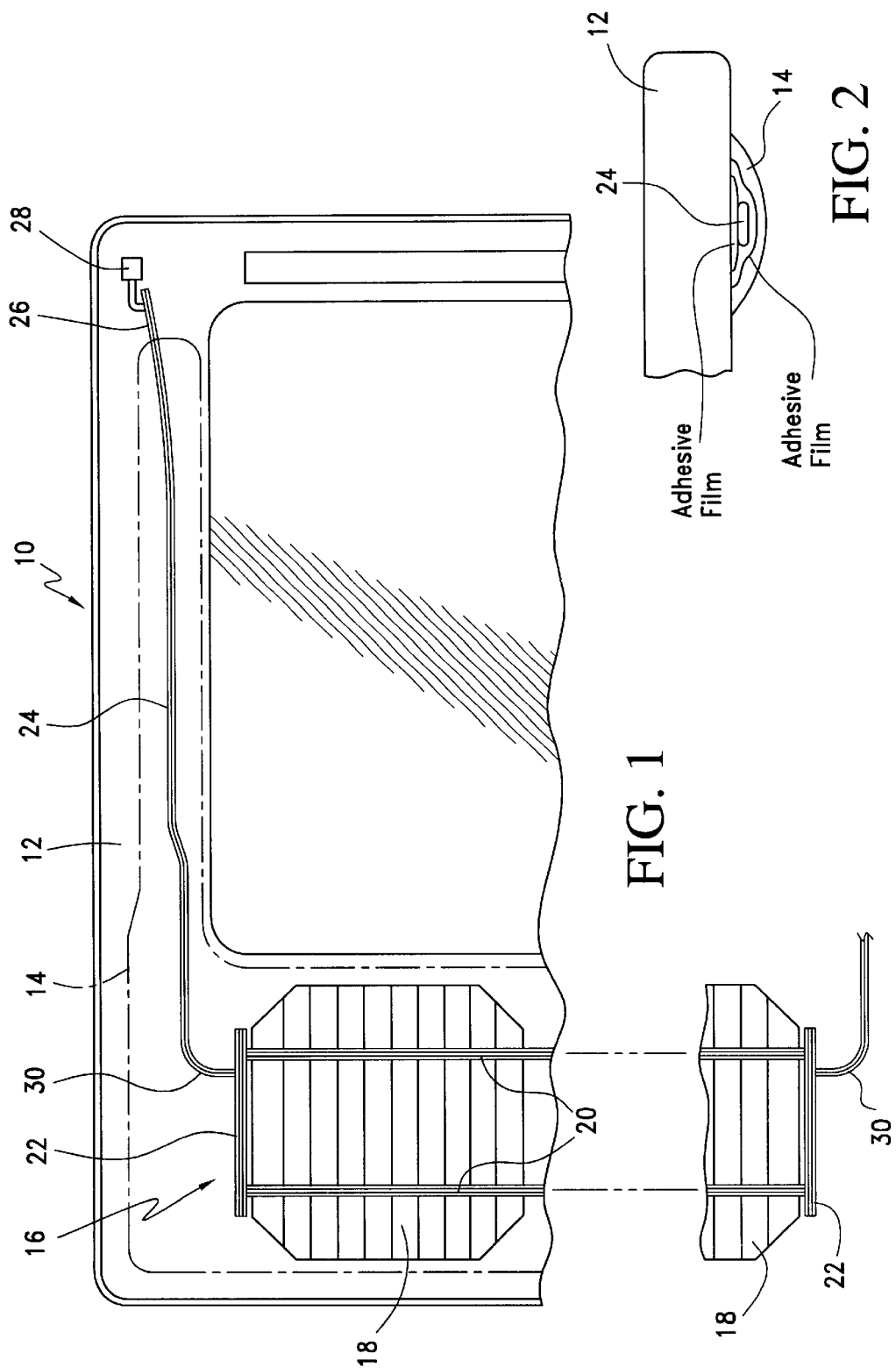

SOLAR COVER FOR A MOTOR VEHICLE ROOF AND A PROCESS FOR ITS MANUFACTURE

BACKGROUND OF THE INVENTION

1. Field of the Invention

This invention relates to a solar cover for a motor vehicle roof with an outside transparent cover panel and an inside cover, between which at least one solar cell is embedded, an electrical contact device for directing the solar current from the at least one solar cell to the motor vehicle and a contact element which produces electrical contact between the at least one solar cell and the contact device and is embedded in the solar cell side area between the cover plate and the cover. The invention is also directed to a process for the manufacture of such a solar cover.

2. Description of Related Art

A generic solar cover is known, for example, from published German Patent Application No. DE 41 05 396 A1. The cover is made as a metallic carrier layer, while the cover plate is made as a thin glass layer. There are a plurality of crystalline solar cells which are electrically interconnected by means of the metallic connectors which are embedded at the same time such that several parallel connected groups are formed from several series connected solar cells at a time. Two collective connectors establish the electrical contact between the solar cells and a respective consumer terminal. These collective connectors or contact elements are embedded completely between the cover and the cover plate. At the location of the consumer terminals, the cover has an opening through which the consumer terminal which forms the electrical contact means is routed to the outside. Here, the disadvantage is that the cover must be perforated to route the contact element or the contact means through the cover.

Published European Patent Application No. EP 0 343 628 A2 discloses a solar module which can be used as a motor vehicle window in which a plurality of solar cells, which are connected by means of connectors, is embedded between two glass plates. The edge of the two congruently positioned glass plates is sealed by means of a resin seal. A rigid electrical contact element which is in electrical contact with the solar cells extends through the resin seal from the intermediate space between the two glass plates to the outside.

German Patent No. DE 41 04 713 C2 discloses a solar module in which a plurality of solar cells which are connected by means of electrodes and which are protected on top by a resin layer are applied to an insulating base plate. One of these electrodes is routed laterally to the outside through the resin layer and forms an electrical contact means on the base plate.

SUMMARY OF THE INVENTION

The primary object of the present invention is to devise a solar cover for a motor vehicle roof in which the solar cell or cells makes or make contact easily with an electrical contact means for directing the solar current to the motor vehicle.

A further object of this invention is devise a production process for such a solar cover.

The aforementioned objects are achieved in accordance with the invention by a solar cover for a motor vehicle roof in which the contact means is located in the horizontal direction outside of the area of the cover plate which is covered by the cover and the contact means-side end of the contact element extends in the horizontal direction over the area covered by the cover to the contact means, and by a corresponding production process.

In achieving the object of the invention, it is advantageous that, on the one hand, no special relieving or opening of the cover is necessary, and on the other hand, the solar cover is economical since a separate connecting cable is unnecessary between the solar cell or cells and the contact means.

In a preferred embodiment, the contact element is made essentially flat, being formed preferably by a pre-punched contact lug. The cover is made preferably as a cover film.

Preferably, there are a plurality of solar cells which are electrically interconnected by means of cell connectors, the solar cells being arranged preferably in parallel-connected groups of several series-connected solar cells, two collective connectors being provided for the groups and the contact element being electrically connected to one of the collective connectors.

In the following one embodiment of the invention is explained using the attached single figure of the drawings.

BRIEF DESCRIPTION OF THE DRAWINGS

FIG. 1 is a view from underneath part of a solar cover in accordance with a preferred embodiment of the invention; and FIG. 2 is a cross-sectional view taken along line 2–2 in FIG. 1.

DETAILED DESCRIPTION OF THE INVENTION

FIG. 1 shows a solar cover 10 which comprises a transparent cover plate 12 for example, of glass or plexiglass, and a cover film 14 between which a solar module 16 is embedded. The solar module 16 comprises several series connected solar cells 18 which are interconnected by means of connectors 20, and a collective connector 22 which is electrically connected to a contact line 24. The contact line 24 is made as a flat, pre-punched part. The other end 26 of the contact line 24 extends to a cover contact 28 which is provided on the bottom of the cover plate 12 and is electrically connected to it. The contact line 24, proceeding from its solar cell-side end 30 is covered by the cover film 14 except for the cover contact-side end 26, and thus, is embedded between the cover film 14 and the cover plate 12, as is the case also in the solar cells 18, the connectors 20, and the collective connector 22. The cover contact 28 is outside the area of the cover plate 12 that is covered by the cover film 14. The cover contact 28 is electrically connected to the collective connector 22, and thus, to the solar cells 18, via the contact line 24 in order to route the solar current which has been generated by the solar cells 18 to a power consumer or to the vehicle battery. The cover contact 28 can thus be made as a sliding contact, for example.

The solar cover 10 is preferably a displaceable cover of a sliding roof, a sliding and lifting roof, or a spoiler roof, for example. The power consumer which is supplied with solar current can be, for example, a fan. Although in the figure only one group of series connected solar cells 18 is indicated, it goes without saying that there can also be also several groups of series connected solar cells connected in parallel by two corresponding collective connectors to increase the solar power. The term "cover plate" which is used here is defined in such a way that it also encompasses the conventionally provided framework of the cover panel of which it is a part.

Between the cover plate 12 and the cover film 14, there can be, in a conventional manner, two hot melt-type adhesive films as the embedding material. Furthermore, the cover can also be formed using a second plate or the like instead of the cover film 14.

The production of the solar cover takes place such that, first, the solar cells 18 with the connectors 20 and 22 are applied to the cover plate 12, the contact line 24 is electrically connected to the collective connector 22, and then, the cover film is applied to the solar module 16 and the corresponding solar cell-side area of the contact line 24. The cover contact 28 can make contact before or after application of the cover film 14.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Solar cover for a motor vehicle roof, comprising a transparent outer cover plate at least one solar cell located in an area of a first edge portion of the outer cover plate, an exposed electrical contact from which solar current produced by the at least one solar cell is directed to the motor vehicle, the electrical contact being located in an area of a second edge portion of the outer cover plate, said second edge portion being at an opposite end of the outer cover plate from said first edge portion, an electrical connector element which electrically connects the at least one solar cell with the electrical contact, and an inner cover; wherein the at least one solar cell and the electrical connector element are embedded between the transparent outer cover plate and the inner cover, said inner cover extending from said area of the first edge portion of the outer cover plate toward said area of the second edge portion of the outer cover plate, but terminating prior to reaching said exposed electrical contact.

2. Solar cover as claimed in claim 1, wherein a plurality of solar cells are embedded between the transparent outer cover plate and the inner cover, the solar cells being electrically interconnected by means of cell connectors, and wherein the electrical connector element is electrically connected to one of the cell connectors.

3. Solar cover as claimed in claim 2, wherein the solar cells are located in parallel connected groups of several series connected solar cells, there being two collective connectors for the groups, and wherein the electrical connector element is electrically connected to one of the collective connectors.

4. Solar cover as claimed in claim the electrical connector element is essentially flat.

5. Solar cover as claimed in claim 4, wherein the electrical connector element is made as a pre-punched part.

6. Solar cover as claimed in claim 1, the inner cover is a cover film.

7. Solar cover as claimed in claim 1, wherein two hot melt-type adhesive films form an embedding material for embedding the at least one solar cell and the contact element between the outer transparent cover plate and the inner cover.

* * * * *